(12) United States Patent
Quatrano et al.

(10) Patent No.: US 7,010,571 B1
(45) Date of Patent: Mar. 7, 2006

(54) COPY SERVER FOR COLLABORATION AND ELECTRONIC COMMERCE

(75) Inventors: Stephen R. Quatrano, Lexington, MA (US); Charles D. Cummings, Lowell, MA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 10/713,618

(22) Filed: Nov. 14, 2003

Related U.S. Application Data

(63) Continuation of application No. 09/347,870, filed on Jul. 6, 1999, now Pat. No. 6,675,216.

(51) Int. Cl.
G06F 15/16 (2006.01)

(52) U.S. Cl. .................. 709/205; 709/203; 709/204; 709/225; 709/226; 709/229; 709/248

(58) Field of Classification Search ........ 709/203–205, 709/225–229, 217, 231, 237, 248
See application file for complete search history.

(56) References Cited

U.S. PATENT DOCUMENTS

| | | | |
|---|---|---|---|
| 5,724,508 A * | 3/1998 | Harple et al. ............. 709/205 |
| 5,774,670 A | 6/1998 | Montulli ................. 395/200.57 |
| 5,861,883 A | 1/1999 | Cuomo et al. ............. 345/326 |
| 5,862,330 A | 1/1999 | Anupam et al. ............. 709/204 |
| 5,862,346 A * | 1/1999 | Kley et al. ............... 709/245 |
| 5,941,957 A | 8/1999 | Ingrassia, Jr. et al. ...... 709/248 |
| 5,951,652 A | 9/1999 | Ingrassia, Jr. et al. ...... 709/248 |
| 5,954,798 A | 9/1999 | Shelton et al. ............. 709/224 |
| 5,987,376 A | 11/1999 | Olson et al. ............... 701/201 |
| 6,035,332 A | 3/2000 | Ingrassia, Jr. et al. ...... 709/224 |
| 6,070,185 A * | 5/2000 | Anupam et al. ............. 709/204 |
| 6,078,948 A | 6/2000 | Podgorny et al. ........... 709/204 |
| 6,105,055 A | 8/2000 | Pizano et al. .............. 709/204 |
| 6,112,240 A | 8/2000 | Pogue et al. ............... 709/224 |
| 6,144,991 A | 11/2000 | England .................... 709/205 |
| 6,161,137 A | 12/2000 | Ogdon et al. ............... 709/224 |
| 6,161,149 A | 12/2000 | Achacoso et al. ........... 710/4 |
| 6,175,872 B1 * | 1/2001 | Neumann et al. ........... 709/231 |
| 6,178,439 B1 | 1/2001 | Feit ........................ 709/200 |
| 6,185,602 B1 | 2/2001 | Bayrakeri .................. 709/204 |
| 6,192,394 B1 | 2/2001 | Gutfreund et al. .......... 709/204 |
| 6,195,091 B1 * | 2/2001 | Harple et al. .............. 709/205 |
| 6,230,171 B1 | 5/2001 | Pacifici et al. ............ 707/512 |
| 6,230,185 B1 | 5/2001 | Salas et al. ................ 709/205 |
| 6,233,600 B1 * | 5/2001 | Salas et al. ................ 709/201 |
| 6,237,025 B1 | 5/2001 | Ludwig et al. ............. 709/204 |
| 6,240,444 B1 | 5/2001 | Fin et al. .................. 709/205 |
| 6,256,389 B1 | 7/2001 | Dalrymple et al. ......... 379/900 |
| 6,259,701 B1 | 7/2001 | Shur et al. ................. 370/401 |
| 6,263,365 B1 * | 7/2001 | Scherpbier ................. 709/218 |
| 6,279,001 B1 | 8/2001 | DeBettencourt et al. ..... 707/10 |
| 6,295,550 B1 | 9/2001 | Choung et al. ............. 709/204 |
| 6,295,551 B1 | 9/2001 | Roberts et al. ............. 709/205 |
| 6,298,356 B1 | 10/2001 | Jawahar ..................... 707/201 |

(Continued)

*Primary Examiner*—Bharat Barot
(74) *Attorney, Agent, or Firm*—Chapin & Huang, L.L.C.; Barry W. Chapin, Esq.

(57) ABSTRACT

Systems and methods for collaborating over the Internet (or an intranet) in which two or more parties, such as a user and an agent, can share dynamic content generated by a web site server. Collaboration can be accomplished on live, dynamic pages without imposing a proxy server between user browsers and the web servers. Mechanisms prevent multiple submissions, and filters can be provided to selectively filter versions of a page for different users.

24 Claims, 3 Drawing Sheets

U.S. PATENT DOCUMENTS

| | | | |
|---|---|---|---|
| 6,308,188 B1 | 10/2001 | Bernardo et al. | 707/530 |
| 6,310,941 B1 | 10/2001 | Crutcher et al. | 379/88.17 |
| 6,314,463 B1 | 11/2001 | Abbott et al. | 709/224 |
| 6,317,777 B1 | 11/2001 | Skarbo et al. | 709/204 |
| 6,317,786 B1 | 11/2001 | Yamane et al. | 709/224 |
| 6,330,566 B1 | 12/2001 | Durham | 707/104 |
| 6,334,141 B1 | 12/2001 | Varma et al. | 709/205 |
| 6,338,086 B1 | 1/2002 | Curtis et al. | 709/218 |
| 6,353,851 B1 * | 3/2002 | Anupam et al. | 709/204 |
| 6,360,250 B1 | 3/2002 | Anupam et al. | 709/204 |
| 6,389,538 B1 | 5/2002 | Gruse et al. | 713/194 |
| 6,393,475 B1 | 5/2002 | Leong et al. | 709/223 |
| 6,411,989 B1 | 6/2002 | Anupam et al. | 709/204 |
| 6,421,678 B1 | 7/2002 | Smiga et al. | 707/102 |
| 6,487,195 B1 * | 11/2002 | Choung et al. | 709/204 |
| 6,535,909 B1 | 3/2003 | Rust | 709/204 |
| 6,584,493 B1 | 6/2003 | Butler | 709/204 |
| 6,611,822 B1 * | 8/2003 | Beams et al. | 709/205 |
| 6,675,216 B1 * | 1/2004 | Quatrano et al. | 709/229 |
| 6,687,739 B1 * | 2/2004 | Anupam et al. | 709/204 |
| 6,687,877 B1 * | 2/2004 | Sastry et al. | 715/512 |
| 6,687,878 B1 | 2/2004 | Eintracht et al. | 715/512 |
| 6,748,420 B1 * | 6/2004 | Quatrano et al. | 709/205 |

* cited by examiner

COPY SERVER FOR COLLABORATION AND ELECTRONIC COMMERCE

This Patent application is a continuation of U.S. application Ser. No. 09/347,870, filed Jul. 6, 1999, now U.S. Pat. No. 6,675,216, entitled "COPY SERVER FOR COLLABORATION AND ELECTRONIC COMMERCE". The entire contents and teachings of this referenced application are hereby incorporated by reference herein in their entirety.

BACKGROUND OF THE INVENTION

Electronic commerce (e-commerce) is growing in popularity with increased use of the Internet and the world wide web. While some web sites just provide information over the web and then rely on telephone calls for placing orders or buying products and services, many other companies, including booksellers and mutual fund companies, allow purchases to be made and other commerce to be transacted over the web. These companies typically have a web server with back end processing software and a database with information that can be provided over the web, including product information and ordering forms. These sites are typically designed to generate dynamic content that is personalized and secure for self-service. If a user is having a problem working with a form on the web site or finding relevant information, the user may be able to call a call center to ask about the problem and describe what he or she sees.

A prior method for collaboration, in which content can be shared over the Internet between a user and an agent, is described in patent publication WO 97/42728, which is expressly incorporated herein by reference.

Dynamic content is content that requires some processing to typically add or select information that is customized or unique to the user in some way. For example, a user who is already known to the web site could be served with a form in which a name, address, and credit card number are filled in at the web site, in advance, for the convenience of the purchaser. Other examples include pages in which content is based on information provided by the user, such as mapping information that obtains from the user an initial position and a destination and performs calculations that determine the directions.

When more than one participant to a collaboration session wish to collaborate with respect to a page that has dynamic content, it is desirable that each user see the same dynamically generated content. However, it would not be desirable for each participant to have the same processing performed repeatedly, because such duplication would create additional overhead and potentially duplicate audit trails and even business transactions. Furthermore, it is very desirable to restrict access to the shared session to collaboration participants, protecting shared content from unauthorized access from the Internet.

SUMMARY OF THE INVENTION

The present invention includes systems and methods for collaborating over the Internet (or an intranet) in which two or more participants, such as one or more users and an agent, can share dynamic content generated by a web site server. The invention facilitates collaboration on real, active forms and dynamic pages without the need to impose a proxy server between user browsers and web servers. The invention also includes mechanisms to facilitate content capture, to prevent multiple submissions, to selectively filter content from either the agent or user views; and to limit collaborative access to collaboration participants.

The invention includes a copy server that can store dynamic content after it is generated by the web site in such a way that the content can be provided repeatedly to two or more participants to a collaboration session without interacting with a web content server, application server, or database. The use of the copy server thus eliminates additional overhead of producing identical dynamic pages for multiple participants, and in some applications will eliminate redundant database entries associated with the production of a dynamic page, such as form submissions and audit trails.

The copy server is different from a proxy server, in that, unlike proxied pages, the copied page in the copy server has live links and active buttons that direct all of the participants browsers back to the original web site rather than to the copy server.

The participants collaborate through a collaboration server, as described in the incorporated document. The content in the copy server can be protected and thus can be made secure such that only authorized participants to a collaboration session are permitted to collaborate using the shared content in the copy server. To accomplish this, the collaboration server communicates with the copy server to identify to the copy server the authorized participants to the collaboration session so that the copy server can restrict access to the content in the copy server.

The copy server can also present different pages to different participants using filters. Such different participants will typically be grouped by role, e.g., as an agent or as a user. The filter, copy server, and collaboration server work together to allow a user and an agent to have the same view of dynamic content where needed, and filter information from one or more different types of views so that one participant may not see everything that another participant does. Such filtering can be controlled, for example, such that the agent sees only what the agent needs, while excluding other content. One use for filtering is to remove a "submit" button from an order form to permit the agent and the user from both submitting the form on behalf of the user.

The present invention also includes components to capture dynamic content and store that content in the copy server. These components are called adapters because they are specific for different types of e-commerce platforms, making the copy server easier to use. In other words, they "adapt" the copy server to different e-commerce environments.

Another feature of the adapters (or appropriate custom code) is the ability to synchronize access to a page to prevent race conditions between multiple participants and to avoid redundant operations. Once identical copies of a page are loaded into multiple participant browsers, a race condition may be created if more than one participant operates on the page and then submits that page to the web server. The adapter only allows one participant to operate on the page through the adapter; subsequent operations are blocked. When a result page is generated from the operation in response to the participant who submitted the page, that resulting page is copied into the copy server and thus becomes the copied page for access by each participant.

Other features and advantages will become apparent from the following detailed description, drawings, and claims.

DETAILED DESCRIPTION

Figure 1:
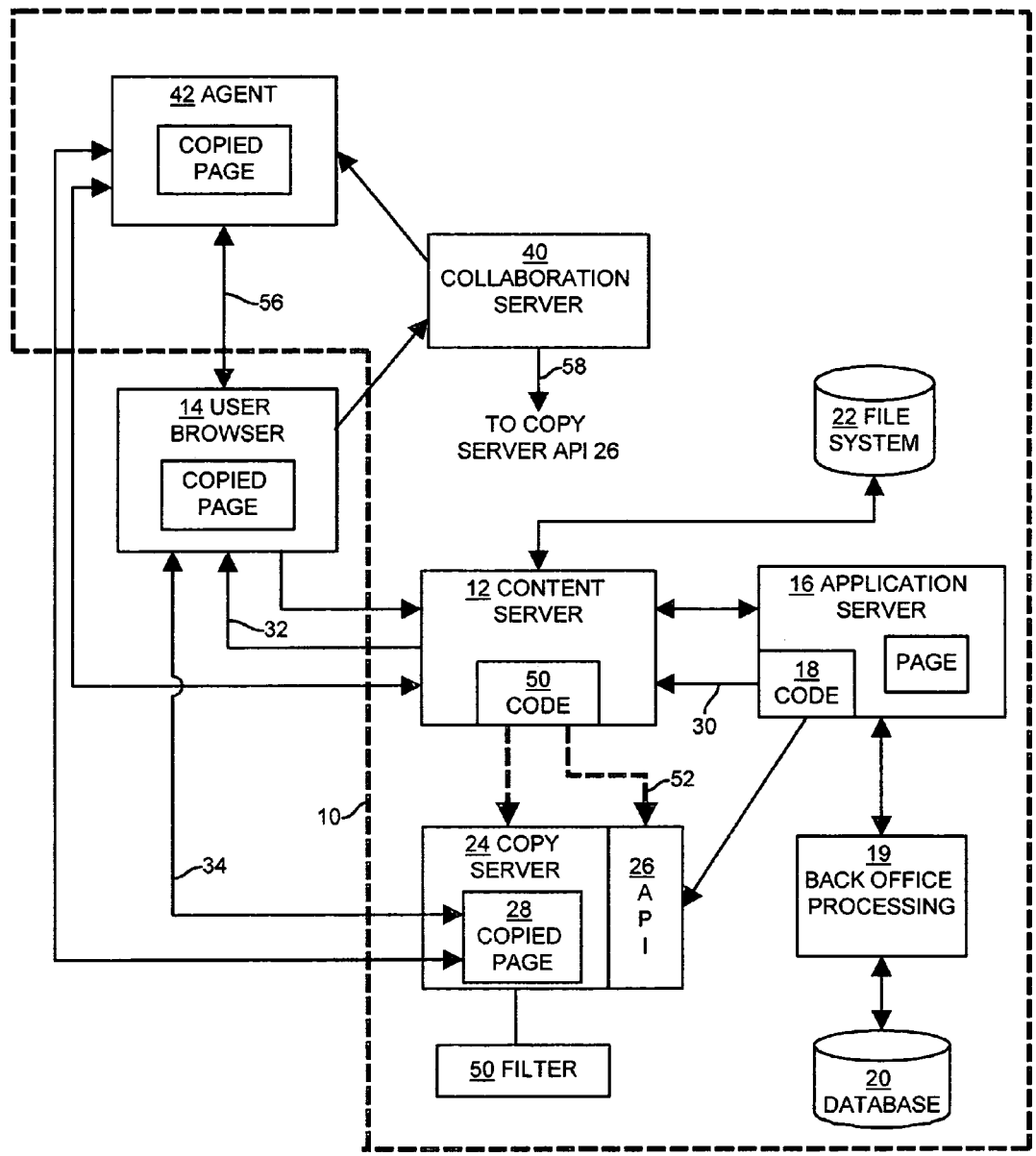
FIGS. 1 and 2 are block diagrams of embodiments of systems according to the present invention.

Referring to FIG. 1, an entity 10 that performs commerce over the Internet, such as an on-line financial services company or an on-line bookseller, has a web site with an HTTP content server 12 that allows a user browser 14 to interact with the web site. User browser 14 accesses content server 12 through the Internet to request information. If the user is requesting static content, i.e., a page of information that does not change regardless of who is accessing it, such as a typical home page, content server 12 can retrieve the page from its own file system 22 and serve the page to user browser 14. For dynamic content, content server 12 passes the request for information to an application server 16. If the application is intended merely to serve dynamic, personalized content, it might format a dynamic page whose content depends on the identity of the client browser. If the application server is a front end to a transaction-based system, then server 16 provides the request to back office processing 19, which uses data from the database 20 in order to provide the processed information back to user browser 14 via application server 16 and content server 12

With or without the back office processing 18 and database 20, this is known as a typical multi-user self-service (non-collaborative) environment. In such a case, a user may not recognize that the content is static or dynamic. Nevertheless, it is possible for each user to experience unique, personalized content which depends on the identity of the user.

According to the present invention, an additional server, referred to as a copy server 24, is provided. Application server 16 has code 18 that causes server 16 to interact with copy server 24 through an application programming interface (API) 26 in copy server 24. Application server 16 provides to the copy server a copy of the page, form, or other dynamic content (referred to here generally as a "page") received from back office processing 19 to become copied page 28 in copy server 24. Copy server 24 stores copied page 28 along with a uniform resource locator (URL) associated with copied page 28 to allow subsequent access. Code 18 captures the page that is provided from processing 19, causes copied page 28 to be stored in copy server 24, and obtains from copy server 24 the URL to identify the copied page. Code 18 then causes the browser requesting the original page to be redirected to the copied page 28 in the copy server 24. The redirection is accomplished with a redirect header provided to content server 12 over connection 30, and then from content server 12 as indicated by line 32 to user browser 14.

User browser 14 thus receives the URL in the redirect header for copied page 28, and uses that URL as indicated by line 34 to automatically access copied page 28 over HTTP. The user, on receiving copied page 28, can then fill in information, for example, if the page is a form, and submit the form back to the web site through content server 12. All of the links in the page relate to the original content server 12 to force operations on the copied page back to the original content server 12. Any resulting response from the application server can again be stored as a copied page.

The copied page is the basis for the collaboration. As described in the incorporated patent document, the user, if desiring a collaboration session, can provide the URL to a collaboration server 40, which forwards the URL to an agent browser 42, and if appropriate to other user browsers. Meanwhile, the user and agent can talk over a separate telephone line 56 or by using voice-over-IP. Agent browser 42 can then use that URL from collaboration server 40 to access and retrieve copied page 28, so that agent browser 42 and user browser 14 both have copied page 28 and both have direct access to the copied page. Such access to copied page 28 is desirable for the user and agent to be able to confer about the content of the copied page.

Collaboration server 40 is preferably an enterprise-class, HTTP server application that enables agents to visually interact with remote users over the Internet while the user and agent can also conduct a voice conversation about the visually shared material. To participate in a collaborative session, a customer need only have an Internet-connected computer and a Java-enabled browser. The voice connection can take place over a separate telephone line or over a single voice/data connection if the appropriate voice-over-IP (VoIP) hardware and software are in place. The agents can share static and dynamic web content with users, can navigate with the users around the web, demonstrate software, help users complete secure web-based forms, or transfer downloadable files, all while simultaneously conducting a voice conversation. Such collaboration is described in more detail in the incorporated patent publication.

One characteristic of copy server 24 is that the copied page loaded into user browser and agent browser contains live links to content server 12 directly, and that application server 16, back office processing 18, and database 20 were accessed (and perhaps updated) only one time in the original production of the copied page. This feature is thus unlike a proxy server in which the proxy server appears to the user to be the actual location of the information, when in fact the proxy server has an internal mapping to an actual location of the information. Bookmarks and historical (cached) pages stored in the browser come from the proxy server not the original source of the dynamic page. A proxy server would also have an undesirable limitation in that the proxy captures all the actual history of the client browser, depriving the content server of valuable data. The copy server 20, on the other hand, does not isolate the content server 12 from the client browser 14 nor does it isolate the server from the direct browser interaction.

In another embodiment of the present invention also shown in FIG. 1, code 18 of the type indicated above for use in application server 16 could alternatively be provided as code 50 in content server 12, with the code coupled to API 26 as represented by dashed line 52.

Copy server 24 can regulate access to copied page 28 so that only authorized participants in a collaboration session are permitted to access the copied page. Collaboration server 40 communicates via connection 58 and copy server API 26 to copy server 24 and tells copy server 24 when participants are added or removed from a collaboration session. Agent browser and user browsers request and receive unique cookies from copy server 24 via HTTP connections 34 if they identify themselves as authentic participants. Subsequent requests for copied pages are granted by the copy server as long as the users are authentic participants in the session.

Figure 2:
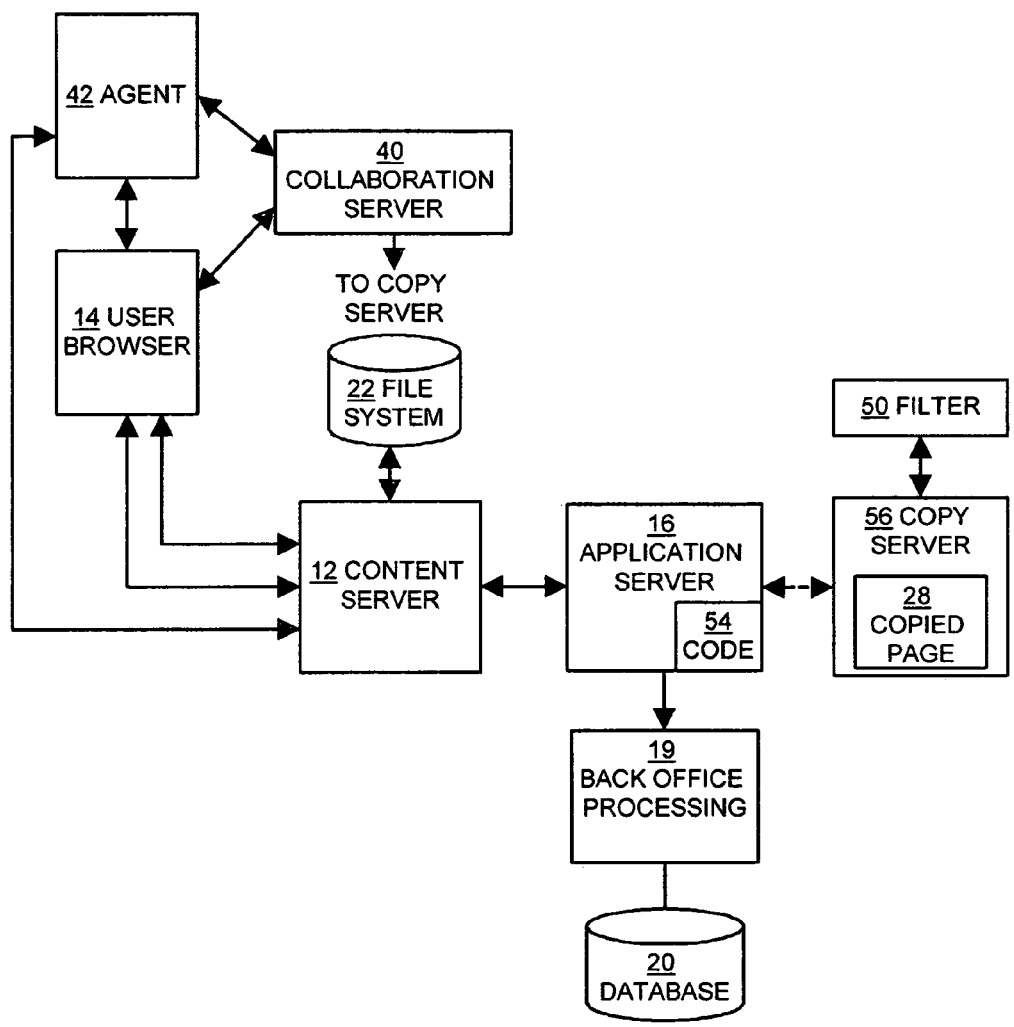

Referring to FIG. 2, in another embodiment of the present invention, unlike the embodiment of FIG. 1 in which the user and agent can directly access copied page 28 from a copy server, a copy server 56 is located behind the security infrastructure of content server 12 and application server 16. Server 16 has code 54 for interacting with copy server 56. In this case, the process is similar to that in the embodiment of FIG. 1, except that the user browser 14 is redirected to copied page 28 through application server 16 and code 54. This approach is more secure, and can take advantage of a more powerful application server for faster processing, although it does mean that the application server will have more functions to perform.

The server code for interacting with the copy server, whether code 18, 50, or 54, each be custom code written by application programmers or system integrators on site for use with copy server API 26. As custom code, it becomes part of the application infrastructure of the site. Alternatively, such code may be an off-the-shelf product, installed and part of the systems infrastructure of the site. As a product, it is a specialized "adapter" that permits a generic plug-in copy server 24 or 56 technology to interoperate with a variety of application server 16 and content server 12 platforms without requiring custom code. Generic adapter technology is "ported" or "adapted" to many specific web server 12 and application server 16 platforms.

The server code for interacting with the copy server, whether code 18, 50, or 54 may also be configured to allow certain URL's to pass through without being copied and without the requesting browser 14 or 42 being redirected. In some cases this is desirable to distribute cookies and other header information to all participants' browsers.

The system of the present invention also preferably includes a filter 50 that operatively works with copy server 24 to determine who the user is, what page the user is requesting, and what information each participant can see. This filter can be used to share some portions of the copied page among all participants but not all portions of the page. Such a filter can preserve secrecy, provide efficiency, and prevent accidental or malicious entry of an order by the wrong participant. The security issue can arise in case information can be displayed on a screen that should not be seen by an agent or user, e.g., if the user accesses account information that also references another user's information, or if an agent needs to check a resource on the web site that also has information that is confidential to other parties. The filter can also be used to offer a button to one participant in a collaborative session while removing it from another, preventing the accidental or malicious operation on a copied page by the wrong user.

Efficiency savings can be obtained because the filter can avoid the need to display unnecessary information on both views, such as additional features that are available but for which agent services are not required, or to filter out logos, advertising, or other information not needed by the agent.

Filter 50 essentially modifies copied page 28 in order to provide that copied page back to the user or the agent thus providing a user version and an agent version of the copied page. Because the agent is associated with the web site entity, the agent can either register through collaboration server 40 to copy server 24 or the agent may be identifiable based on an aspect of their request. The filter will thus be able to discriminate the user version of the copied page from the agent version of the copied page. The filtering code will typically be associated with particular pages, such that for a particular form and type of participant (agent or client), the code will suppress some piece of the form.

Figure 3:
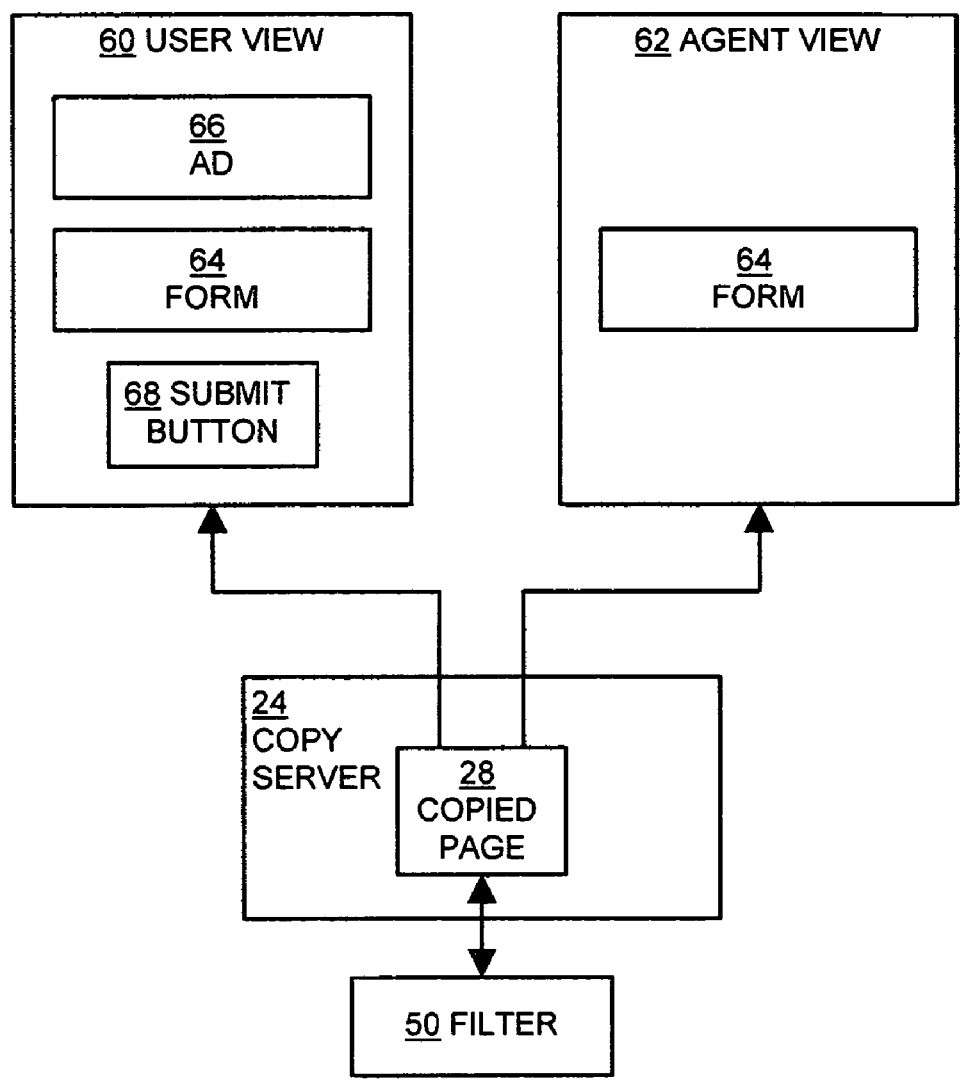
FIG. 3 is a block diagram illustrating the filtering function.

As shown in FIG. 3, copy server 24 can provide copied page 28 to a user view 60 or an agent view 62. In this example, user view 60 has a form region 64, an ad 66, and a submit button 68. Agent view 62, however, only has form 64 but does not provide ad 66, and also does not provide submit button 68 that would otherwise allow either participant to submit the form. This filtering can be achieved with code designed for and associated with specific forms, or certain types of information, such as a PIN, can always be suppressed to the agent. Thus, a request for the page causes a filter routine to be invoked to determine how to display information.

To prevent multiple processing on a page, the server code for interacting with the copy server, whether code 18, 50, or 54 can determine when a page has been submitted and prevent a further submission until a result page is sent. Referring again to FIGS. 1 and 2, assume there is a collaboration session and a first user enters information into the copied page and submits the page back to the web site for processing. The operation is sent from user browser 42 or 14 to content server 12 to application server 16 where code 18 is invoked to determine if this is the first operation on a copy or not. If it is the first operation on the copy, the application continues and may interact with back office processing 19 and database 20. If a second user (or agent) tries to submit the page with different inputs, code 18 stops the processing on the second submission and generates and returns a configurable "please wait" result page to the second user's browser indicating that the second user has to wait. When the first submission is processed, a resulting page is captured by code 18, stored as a copied page 28 in the copy server 24, and the first user is redirected to the copy page. Once the copied page becomes current in the collaboration server 40, it replaces the "please wait" page on the second user's browser and can be viewed and discussed further by the participants. The system thus prevents inconsistent or duplicative submissions of the shared copied page.

Having described preferred embodiments of the present invention, it should be apparent that modifications can be made without departing from the scope of the invention as defined by the appended claims.

What is claimed is:

1. A method for providing collaboration between a first user and a second user comprising:

receiving, at a web site, a request from the first user with a browser;

processing the request with information related to the first user to create a page with dynamic content;

copying the page with dynamic content into a copy server without changing any locators in the page, the copy server having the page with dynamic content as a copied page;

providing, to the first user, a locator for the copied page of the copy server, the locator allowing the first user to access the copied page from the copy server; and providing, to the second user, the locator for the copied page of the copy server, the locator allowing the second user to access the copied page from the copy server, the first user and the second user viewing versions of the same copied page; and synchronizing access to the copied page to block multiple users from operating on the copied page, synchronizing including employing the locator by the first user for modifying the copied page such that the second user is blocked from modifying the copied page until the modifications performed by the first user are written to the copied page at the copy server from the modified dynamic content page.

2. The method of claim 1 further comprising:
identifying a collaboration set of users having the ability to access the copied page, the first and second users included in the collaboration set; and
permitting only one of the first and second users from operating on the copied page.

3. The method of claim 2 further comprising establishing a collaboration session by sending cookies between the copy server and the first and second user browsers, the copy server responsive to a collaboration server for sending cookies and identifying modifications to the collaboration set.

4. The method of claim 1 further comprising copying the copied page to each of the first and second users, the copied page residing on a respective user browser, wherein each of the first and second users access the copied page on the respected user browser, and wherein the copy server allows one of the first and second users to be operating on the copied page at the copy server.

5. The method of claim 4 wherein the second user corresponds to an agent browser responsive to the first user browser.

6. The method of claim 1 further comprising:
providing an informational message to the second user when the first user is operating on the copied page at the copy server; and
unblocking the second user when the first user completes operating on the copied page at the copy server.

7. The method of claim 1 further comprising:
determine which information of the copy page each of the first and second user is permitted to observer; and
filtering the content of the page displayed on the respective user browser of the first and second user.

8. The method of claim 7 further comprising discriminating between the filtered versions of the copied pages by identifying the corresponding request for the copied page emanating from each of the first and second user.

9. The method of claim 7 further comprising:
identifying the information to be limited in the copied page;
suppressing the identified information from the information sent to the browser of the second user by selectively sending according to the filter; and;
receiving a form including information corresponding to the suppressed information from the first user.

10. The method of claim 1 wherein operating on the copied page further comprises identifying which of the first and second user is modifying the copied page.

11. A data communications device for providing collaboration between a first user and a second user comprising:
a web server operable to receive a request from the first user with a browser;
a page processor operable to process the request with information related to the first user to create a page with dynamic content;
a copy server operable to copy the page with dynamic content into a memory without changing any locators in the page, the copy server having the page with dynamic content as a copied page, the the web server operable to provide, to the first user, a locator for the copied page of the copy server, the locator allowing the first user to access the copied page from the copy server; and to provide, to the second user, the locator for the copied page of the copy server, the locator allowing the second user to access the copied page from the copy server, the first user and the second user viewing versions of the same copied page; and
an adapter in the web server operable to synchronize access to the copied page to block multiple users from operating on the copied page, synchronizing access including employing the locator by the first user for modifying the copied page such that the second user is blocked from modifying the copied page until the modifications performed by the first user are written to the copied sage at the copy server from the modified dynamic content page.

12. The data communications device of claim 11 further comprising
a collaboration server operable to identify a collaboration set of users having the ability to access the copied page, the first and second users included in the collaboration set, and
a blocking mechanism, responsive to the copy server, operable to permit only one of the first and second users from operating on the copied page.

13. The data communications device of claim 12 wherein the collaboration server is further operable to establish a collaboration session by sending cookies between the copy server and the first and second user browsers, the copy server responsive to a collaboration server for sending cookies and identifying modifications to the collaboration set.

14. The data communications device of claim 11 wherein the web server is further operable to copying the copied page to each of the first and second users, the copied page residing on a respective user browser, wherein each of the first and second users access the copied page on the respected user browser, and wherein the copy server allows one of the first and second users to be operating on the copied page at the copy server.

15. The data communications device of claim 14 wherein the second user corresponds to an agent browser responsive to the first user browser.

16. The data communications device of claim 11 wherein the copy server is further operable to:
provide an informational message to the second user when the first user is operating on the copied page at the copy server; and
unblock the second user when the first user completes operating on the copied page at the copy server.

17. The data communications device of claim 11 further comprising a filter operable to determine which information of the copy page each of the first and second user is permitted to observer, the filter further operable to filter the content of the page displayed on the respective user browser of the first and second user.

18. The data communications device of claim 17 wherein the filter further comprises filtering code operable to discriminate between the filtered versions of the copied pages by identifying the corresponding request for the copied page emanating from each of the first and second user.

19. The data communications device of claim 18 wherein the filter is further operable to:
identify the information to be limited in the copied page;
suppress the identified information from the information sent to the browser of the second user by selectively sending according to the filter; and
receive a form including information corresponding to the suppressed information from the first user.

20. The data communications device of claim 11 wherein the copy server is further operable identify which of the first and second user is modifying the copied page.

21. A computer program product having a computer readable medium with computer program logic embodied in computer program code encoded thereon for providing collaboration between a first user and a second user comprising:
  computer program code for receiving, at a web site, a request from the first user with a browser;
  computer program code for processing the request with information related to the first user to create a page with dynamic content;
  computer program code for copying the page with dynamic content into a copy server without changing any locators in the page, the copy server having the page with dynamic content as a copied page;
  computer program code for providing, to the first user, a locator for the copied page of the copy server, the locator allowing the first user to access the copied page from the copy server; and
  computer program code for providing, to the second user, the locator for the copied page of the copy server, the locator allowing the second user to access the copied page from the copy server, the first user and the second user viewing versions of the same copied page; and
  computer program code for synchronizing access to the copied page to block multiple users from operating on the copied page, synchronizing access including employing the locator by the first user for modifying the copied page such that the second user is blocked from modifying the copied page until the modifications performed by the first user are written to the copied page at the copy server from the modified dynamic content page.

22. A computer data signal embodied in carrier wave encoded with computer program code for providing collaboration between a first user and a second user comprising:
  program code for receiving, at a web site, a request from the first user with a browser;
  program code for processing the request with information related to the first user to create a page with dynamic content;
  program code for copying the page with dynamic content into a copy server without changing any locators in the page, the copy server having the page with dynamic content as a copied page;
  program code for providing, to the first user, a locator for the copied page of the copy server, the locator allowing the first user to access the copied page from the copy server; and
  program code for providing, to the second user, the locator for the copied page of the copy server, the locator allowing the second user to access the copied page from the copy server, the first user and the second user viewing versions of the same copied page; and
  program code for synchronizing access to the copied page to block multiple users from operating on the copied page, synchronizing access including employing the locator by the first user for modifying the copied page such that the second user is blocked from modifying the copied page until the modifications performed by the first user are written to the copied page at the copy server from the modified dynamic content page.

23. A data communications device for providing collaboration between a plurality of users comprising:
  means for receiving, at a web site, a request from the first user with a browser;
  means for processing the request with information related to the first user to create a page with dynamic content;
  means for copying the page with dynamic content into a copy server without changing any locators in the page, the copy server having the page with dynamic content as a copied page;
  means for providing, to the first user, a locator for the copied page of the copy server, the locator allowing the first user to access the copied page from the copy server; and
  means for providing, to the second user, the locator for the copied page of the copy server, the locator allowing the second user to access the copied page from the copy server, the first user and the second user viewing versions of the same copied page; and
  means for synchronizing access to the copied page to block multiple users from operating on the copied page, synchronizing access including employing the locator by the first user for modifying the copied page such that the second user is blocked from modifying the copied page until the modifications performed by the first user are written to the copied page at the copy server from the modified dynamic content page.

24. A method for providing collaboration between a first user and a second user comprising:
  receiving, at a web site, a request from the first user with a browser;
  processing the request with information related to the first user to create a page with dynamic content;
  copying the page with dynamic content into a copy server without changing any locators in the page, the copy server having the page with dynamic content as a copied page;
  providing, to the first user, a locator for the copied page of the copy server, the locator allowing the first user to access the copied page from the copy server; and providing, to the second user, the locator for the copied page of the copy server, the locator allowing the second user to access the copied page from the copy server, the first user and the second user viewing versions of the same copied page; and
  synchronizing access to the copied page to:
    i) prevent race conditions between the first and second user for access to the copied page;
    ii) to avoid redundant operations made by at least one of the first user and the second user to the copied page; and
    iii) identify which of the first and second user is modifying the copied page.

* * * * *

UNITED STATES PATENT AND TRADEMARK OFFICE
CERTIFICATE OF CORRECTION

| | | |
|---|---|---|
| PATENT NO. | : 7,010,571 B1 | Page 1 of 1 |
| APPLICATION NO. | : 10/713618 | |
| DATED | : March 7, 2006 | |
| INVENTOR(S) | : Stephen R. Quatrano and Charles D. Cummings | |

It is certified that error appears in the above-identified patent and that said Letters Patent is hereby corrected as shown below:

Claim 11, Column 8, Line 8, "the copied sage at the copy server from the modified" should read -- the copied page at the copy server from the modified --.

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,010,571 B1 Page 1 of 1
APPLICATION NO. : 10/713618
DATED : March 7, 2006
INVENTOR(S) : Stephen R. Quatrano and Charles D. Cummings It is certified that error appears in the above-identified patent and that said Letters Patent is hereby corrected as shown below:

Claim 11, Column 8, Line 8, "the copied sage at the copy server from the modified" should read -- the copied page at the copy server from the modified --.

Signed and Sealed this

Twenty-sixth Day of December, 2006

JON W. DUDAS
*Director of the United States Patent and Trademark Office*